United States Patent

Gibson et al.

[11] Patent Number: 6,077,082
[45] Date of Patent: Jun. 20, 2000

[54] PERSONAL PATIENT SIMULATION

[75] Inventors: Sarah Frances Frisken Gibson, Arlington; William Eric Leifur Grimson, Lexington, both of Mass.; Takeo Kanade, Pittsburgh, Pa.; Ron Kikinis, Brookline, Mass.

[73] Assignee: Mitsubishi Electric Information Technology Center America, Inc. (ITA), Cambridge, Mass.

[21] Appl. No.: 09/017,462

[22] Filed: Feb. 2, 1998

[51] Int. Cl.[7] ................................................. G09B 23/28
[52] U.S. Cl. ................ 434/262; 434/307 R; 395/500.34
[58] Field of Search .................... 434/262, 236, 434/307 R, 238, 265, 308, 365, 118; 395/500.27, 500.34; 709/1, 217; 345/473

[56] References Cited

U.S. PATENT DOCUMENTS

| | | | |
|---|---|---|---|
| 5,385,474 | 1/1995 | Brindle | 434/262 X |
| 5,403,191 | 4/1995 | Tuason | 434/262 X |
| 5,513,992 | 5/1996 | Refait | 434/262 X |
| 5,584,701 | 12/1996 | Lampotang et al. | 434/262 X |
| 5,680,590 | 10/1997 | Parti | 395/500 X |
| 5,791,907 | 8/1998 | Ramshaw et al. | 434/262 X |
| 5,800,177 | 9/1998 | Gillio | 434/262 X |
| 5,810,747 | 9/1998 | Brudny et al. | 600/595 X |
| 5,871,018 | 2/1999 | Delp et al. | 128/898 X |

*Primary Examiner*—Jessica J. Harrison
*Assistant Examiner*—Chanda Harris
*Attorney, Agent, or Firm*—Dirk Brinkman

[57] ABSTRACT

A patient simulation includes a patient generator for providing an image of a body of a patient on a display, where at least one portion of the body can be examined in greater detail; at least one communication device for allowing interaction between the patient and a user; and a behavior generator which causes the patient to appear to respond to treatment. The behavior generator includes psychological state data that allows the patient to react to the user's "bedside manner." Further, the simulation operates on a non-stop basis and in real time.

8 Claims, 3 Drawing Sheets

PERSONAL PATIENT SIMULATION

BACKGROUND OF THE INVENTION

The present invention is related to computer generated simulations, a nd more particularly to computer generated simulations of medical procedures.

Computer gene rated simulation of medical procedures such as dissection is known. Two dimensional views of organs and other body parts of an animal such as a frog are arranged in layers using a graphics program. Students can then "remove" body parts by selecting and deleting images of the parts to reveal other body parts associated with the next layer in the file. These simulations allow students to learn about anatomy without working with an actual human or animal carcass and are also cost effective. Simulations are also known for the study of human anatomy and for facilitating explanation of surgical procedures. There remains a need, however, for a simulation which provides a more realistic representation of medical practice.

BRIEF SUMMARY OF THE INVENTION

In accordance with the present invention a patient simulation system includes a patient generator for providing an image of a body of a patient on a display, where at least one portion of the body can be examined in greater detail; at least one communication device for allowing interaction between the patient and a user; and a behavior generator which causes the patient to appear to respond to treatment. The simulation operates in real time. Devices for facilitating communication between the user and the patient include voice synthesizers for allowing verbal interaction, computer input/output devices such as a keyboard, mouse, joystick, track ball, pressure sensitive pad and the like, and a device for activating a pager system. Further, the behavior generator is programmed to cause the patient to appear to respond ta the administration of medication, surgical procedures, questions posed by the user, the bedside manner of the user and various therapies.

One advantage associated with the present invention is that a fairly realistic real-time representation of a doctor-patient relationship can be generated in software and implemented on a personal computer. Known simulations do not represent physical and psychological patient reactions. However, such reactions are a significant part of actual medical practice. Further, significant portions of the doctor-patient relationship such as the possibility of the patient requiring attention at any particular moment of the day, false responses and symptoms, and response to bedside manner are provided by the present invention for a more realistic experience than known simulations.

BRIEF DESCRIPTION OF THE DRAWING

The invention will be more fully understood in view of the following Detailed Description of the Invention, and the Drawing, of which.

DETAILED DESCRIPTION OF THE INVENTION

Figure 1:
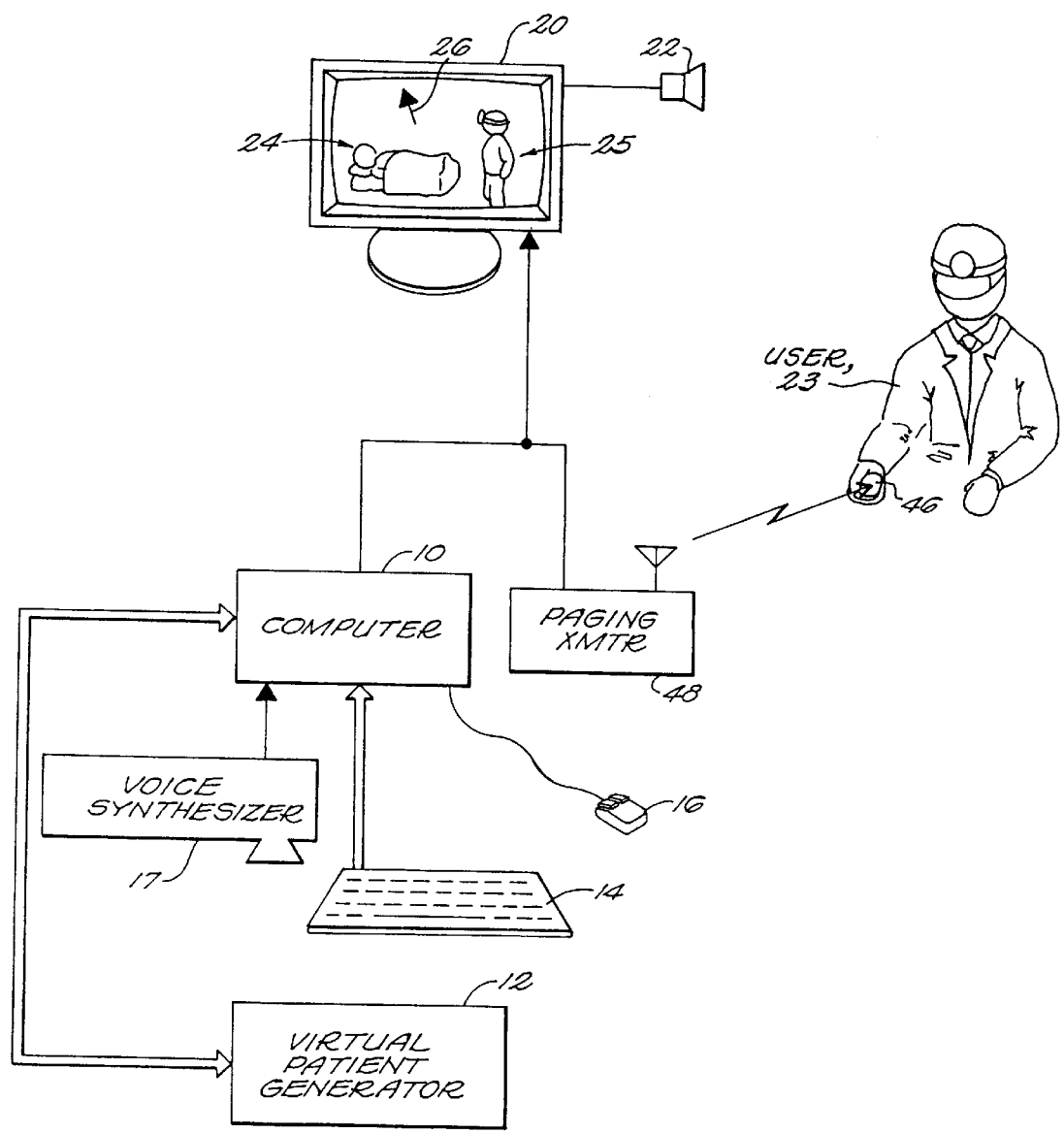
FIG. 1 is a block diagram of patient simulation system hardware.

FIG. 1 illustrates a doctor-patient interaction simulation system. The simulation system includes a computer 10 that executes virtual patient generator software 12. The computer 10 accepts input from a keyboard 14, mouse 16, a voice synthesizer 17 and other devices such as a joystick, a track ball, and a pressure sensitive pad. Visual output is presented on a monitor display 20. Audio output is presented through speakers 22.

A computer generated "patient" 24 is presented to a user 23 via the display 20 and speakers 22. The patient 24 is initially presented in a view that displays the entire body of the patient. The user 23, as represented on the display by a doctor 25, can then interact with the patient 24 by viewing hospital admissions papers, communicating with the patient by speaking into the voice synthesizer 17, and examining any portion of the patient's body in closer detail by selecting that portion with one of the input devices. The mouse 16 controls a cursor 26 that is presented on the display 20. A portion of the patient's body is selected for closer examination by moving the cursor 26 over that portion and employing the mouse button. If desired, examination of the patient's body includes simulated contact between the doctor's hands or medical instruments and the body of the patient 24. For example, such contact could include probing an injured limb to determine whether a bone is broken.

Figure 2:
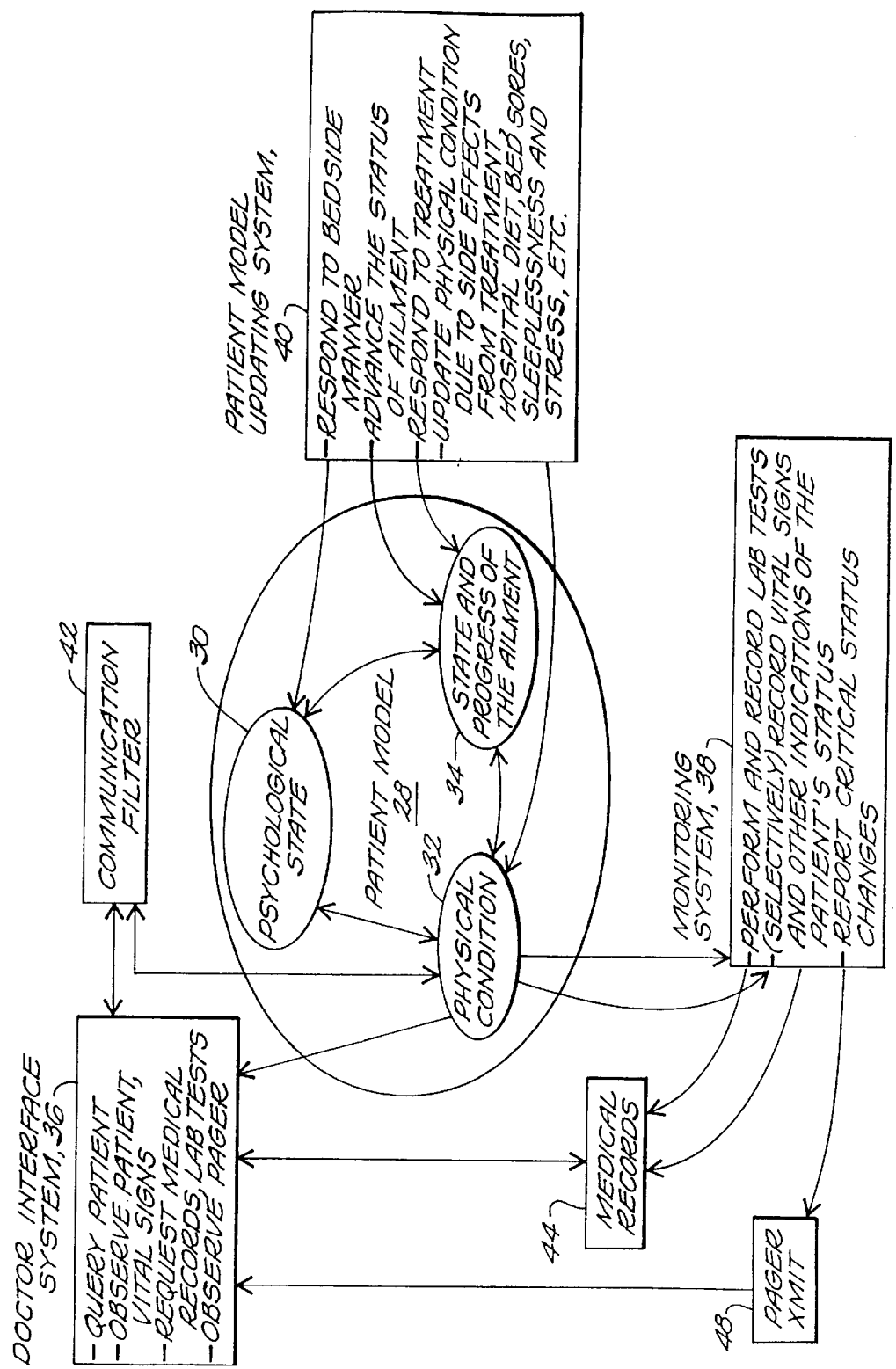
FIG. 2 is a block diagram of patient simulation system software.

Referring now to FIGS. 1 and 2, patient data is maintained in a patient model 28. The patient model 28 includes a psychological state data portion 30, a physical condition data portion 32 and a state and progress of the ailment data portion 34 which are stored in a memory or on a disk. Based on the data in the patient model 28 the patient generator software 12 causes the patient 24 to respond to input from the user 23 by generating sounds, including speech, through the speakers 22 and by presenting images on the display 20. For example, the simulated patient 24 could express discomfort and pull away upon contact with a broken limb. The patient model 28 is unique to the patient with which the model is associated. Hence, the responses of different patients vary for given input and illness/injury.

The patient generator software 12 employs a doctor interface system 36, a monitoring system 38 and a patient model updating system 40 to simulate patient behavior. The user 23 can submit a query to the patient 24 via the doctor interface system 36 and a communication filter 42. The query can be submitted via input/output devices such as the keyboard, mouse and voice synthesizer, or submitted via simulated physical examination of the patient by the doctor 25. Data from the patient model 28 is provided to the doctor interface system 36 in response to the query. Patient model data defines the patient's reaction to the query. Information from the physical condition data portion 32 is provided directly to the doctor interface system 36 to generate vital signs which can be observed by the user 23. Medical records and lab tests are accessed through the doctor interface system 36 and a medical records data portion 44.

Following initial examination the user is provided an opportunity to decide on further action. For example, the user could direct that the system initiate various simulated batteries of tests such as X-ray, Magnetic Resonance Imaging ("MRI") and blood tests or any other simulated medically recognized test. The results of these tests and other laboratory data are generated by the monitoring system 38 based upon data in the patient model and can be automatically stored on a simulated patient chart maintained in the medical records data portion 44. Real-time readouts from instruments such as an Electrocardiograph ("ECG") are similarly generated for presentation on the display 20. Common actions such as ordering specific tests can be presented and chosen via pull-down menus on the display.

Once results are produced from the simulated tests that were performed on the patient, the user makes a more complete diagnosis and chooses further action. For example, the simulated patient 24 could be placed on medication and/or given a variety of treatments including surgery. Patient response to simulated treatment is caused by updating the data maintained in the patient model 28. In particular, the patient model updating system 40 modifies the state and progress of the ailment data portion 34 and the physical condition data portion 32 to reflect advances in the status of the ailment, response to treatment, side effects from treatment, diet and other factors. The patient model updating system 40 also modifies the psychological state data portion 30 in response to the "bedside manner" of the doctor. Some changes in data in the patient model 28, such as vital signs, are provided automatically to the medical records data portion 44 via the monitoring system 38. Other changes in the data in the patient model, such as psychological changes, are presented through patient behavior.

The psychological state data portion 30 allows a more realistic doctor-patient interaction. Patient actions are based in-part upon the psychological state data portion maintained in the patient model. For example, the patient 24 may be predisposed via the psychological state data portion to respond unreliably to questions posed by the user about particular subjects during examination. Further, the patient's responses are dependent upon the user's input and the patient's psychological state. For example, some patients may respond poorly to excessive probing during examination, and some patients may respond positively to reassuring verbal interaction. Hence, the "bedside manner" of the user has an effect upon the simulated patient's response and progress based upon data contained within the respective model.

A further feature that provides a more realistic simulation is a pager device 46. The patient simulation system includes a paging transmitter 48 that can be activated by the patient simulation software 12. The patient simulation software activates the pager 46 by operating the pager transmitter 48 when the simulated patient 24 requires the user's immediate attention.

Figure 3:
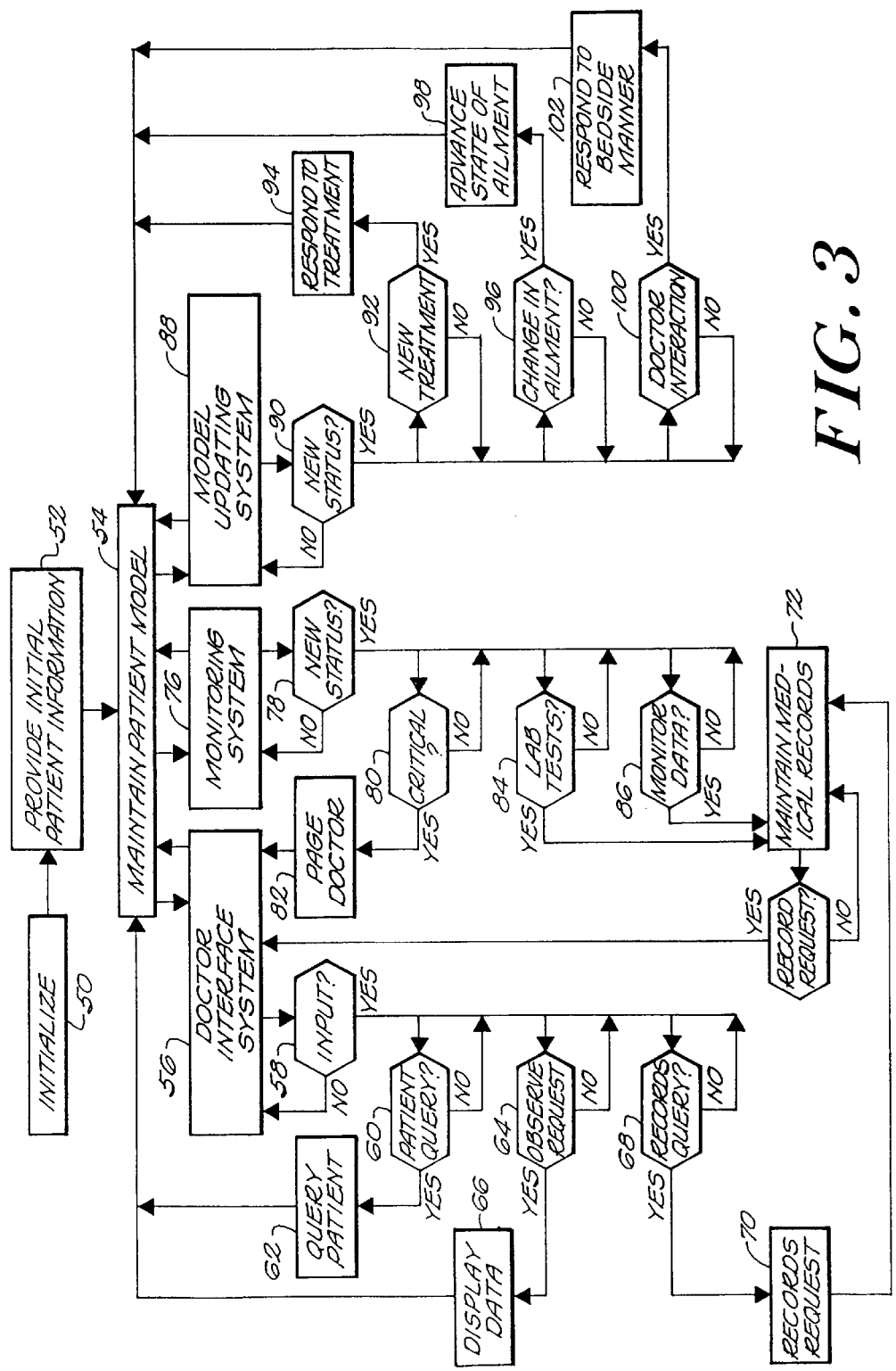
FIG. 3 is a flow diagram of the method of generating the patient simulation.

Referring to FIGS. 2 and 3, the patient simulation is initialized as indicated in step 50 by determining which input/output devices are available. The patient model 28 is then loaded with data for a patient as indicated in step 52. The patient model is then maintained as indicated in step 54 by monitoring input/output devices and data in the patient model to determine which system to access. If the doctor interface system is accessed, as indicated in step 56, the simulation software enters a loop to await input as indicated in step 58. When input is received, flow continues dependent upon the type of input. If the input is a patient query as determined in step 60, the patient is queried by accessing the patient model data via the communication filter as indicated in step 62. If the input is a request to observe the patient, as determined in step 64, patient data is retrieved from the patient model and displayed as indicated in step 66. If the input is a records query as determined in step 68, a records request is generated as indicated in step 70 for submission to the medical records data portion as indicated in step 72. In the case of a records request as determined in step 74, flow then returns to step 56.

If the monitoring system is accessed, as indicated in step 76, the simulation software enters a loop to await a status change as indicated in step 78. When a status change is indicated, flow continues dependent upon the type of status change. If the input is a critical status change as determined in step 80, then the user is paged by activating the pager transmitter as indicated in step 82. If lab test results are being returned, as indicated in step 84, then the medical records data portion is updated as indicated in step 72. If the status change includes information being monitored such as vital signs, as determined in step 86, then the medical records data portion is updated as indicated in step 72.

If the model updating system is accessed, as indicated in step 88, the simulation software enters a loop to await a status change as indicated in step 90. When a status change is indicated, flow continues dependent upon the type of status change. If the input is a new treatment, as determined in step 92, the patient model is updated to reflect response to the treatment as indicated in step 94. If the input is a change in the ailment, as determined in step 96, the state of ailment data portion is updated as indicated in step 98. If the input is doctor interaction, as determined in step 100, the psychological state data portion is updated in response to the bedside manner of the doctor as indicated in step 102.

The doctor-patient relationship can be made even more realistic by running the simulation on a continuing basis in real-time. Practicing physicians cannot simply "pause" the action when they become fatigued, otherwise involved, distracted or frustrated. Further, instant responses to medical treatments are not always observable in actual medical practice. Hence, these difficulties are mimicked in the simulation by, for example, forcing the user to wait some period of time up to hours, days or weeks to get results from ordered tests, preferably based upon stored data approximating the average time required to get such results in actual medical practice. Similarly, the user is not allowed to pause the simulation during an operation, or at any other point, but rather must complete whatever task is being presented.

Since the simulation is run on a continuing basis, a patient may require attention at any time. Verbal and visual queues that the patient requires attention may be presented by employing the display 20 and speakers 22. Further, the monitoring system may trigger the pager transmitter 48 if the user fails to respond to the verbal and visual queues within a predetermined period of time. The transmitter activates the pager device 46 that the user carries when away from the simulation display.

In an alternative embodiment the patient 24 may be presented as a non-human subject to allow instruction at reduced levels of anxiety for users who initially feel uncomfortable with human patients. The non-human subject could be modeled upon a known animal or be a completely fanciful creature.

Having described the preferred embodiments of the invention, other embodiments which incorporate concepts of the invention will now become apparent to one of skill in the art. Therefore, the invention should not be viewed as limited to the disclosed embodiments but rather should be viewed as limited only by the spirit and scope of the appended claims.

What is claimed is:

1. A patient simulation comprising:
   a patient generator that provides an image of a simulated patient generated by software from a patient data model stored in a memory;
   a display for presenting the image of the simulated patient to a user, wherein at least one portion of the simulated patient can be examined in greater detail on the display;
   at least one communication device allowing interaction between the patient data model and the user; and
   a behavior generator which causes the simulated patient to respond to treatment.

2. The patent simulation of claim 1 wherein said simulation runs only continuously without pausing by the user.

3. The patient simulation of claim 2 wherein said simulation operates in real time.

4. The patient simulation of claim 3 wherein the behavior generator causes the simulated patient to require care following an initial treatment, and further including a transmitter and paging device, said transmitter being employed to activate the paging device if the simulated patient does not receive attention for a predetermined period of time after the behavior generator causes the simulated patient to require care.

5. The patient simulation of claim 4 wherein the behavior generator includes a psychological profile of the simulated patient, and wherein the psychological profile effects simulated patient behavior.

6. The patient simulation of claim 5 further including a voice synthesizer and at least one speaker for allowing verbal interaction between the user and the patient.

7. A patient simulation system, comprising:

a patient generator operative to provide output data defining the medical condition of a patient;

a display generator operative to display information corresponding to said output data for said patient on a display;

a call generator responsive to said output data to provide a visual indication on said display of at least one medical condition of said patient requiring attention by a user;

a pager; and at least one input device for providing input to said simulation system;

said call generator operative to activate said pager to alert said user in the absence of the activation of said at least one input device by said user within a predetermined period of time following said provision of said visual indication.

8. A method for simulating a patient, comprising the steps of:

generating an image of a simulated patient from a patient data model stored in a computer memory;

displaying the image on a computer monitor for a user; and interacting between the user and the patient data model to have the simulated patient respond physiologically and psychologically to treatment.

* * * * *